United States Patent [19]

Nissen et al.

[11] Patent Number: 5,450,757
[45] Date of Patent: Sep. 19, 1995

[54] APPARATUS FOR MEASURING THE FLOW OF A FLUID FLOWING THROUGH A MEASURING TUBE

[75] Inventors: Peter Nissen, Rosdorf; Hans W. Schwiderski, Nörten-Hardenberg, both of Germany

[73] Assignee: Fischer & Porter GmbH, Goettingen, Germany

[21] Appl. No.: 288,270

[22] Filed: Aug. 11, 1994

[30] Foreign Application Priority Data

Aug. 11, 1993 [DE] Germany .................. 43 26 991.5

[51] Int. Cl.⁶ .............................................. G01F 1/58
[52] U.S. Cl. ................................................ 73/861.12
[58] Field of Search ............ 73/861.12, 861.08, 861.16

[56] References Cited
U.S. PATENT DOCUMENTS 4,137,765 2/1979 Matsushita ................. 73/861.12

Primary Examiner—Richard E. Chilcot, Jr.
Assistant Examiner—Elizabeth L. Dougherty
Attorney, Agent, or Firm—Foley & Lardner

[57] ABSTRACT

An apparatus for measuring the flow of fluid through a substantially horizontal measuring tube includes coils for producing two states of a magnetic field in which the magnetic fields extend through the measuring tube in a horizontal plane. The magnetic field in a first state extends through a first horizontal plane which intersects the measuring tube in substantially the same direction on both sides of the horizontal plane and in a second state extends in substantially opposite directions on both sides of the first horizontal plane. A pair of electrodes arranged at the measuring tube senses displacement of changes in the fluid and an electrical circuit corrects the voltage Ur between the electrodes in the first state of the magnetic field by using the voltage Ug between the electrodes in the second state of the magnetic field to obtain an output signal substantially proportional to the flow of the fluid. The electrodes are located in a second horizontal plane which is offset relative to the first horizontal plane so that an unambiguous relation exists between the voltages Ug and Ur on the one hand and the flow of the fluid on the other hand. Furthermore, the relation is dependent on the flow of the fluid but independent of the flow profile of the fluid.

2 Claims, 3 Drawing Sheets

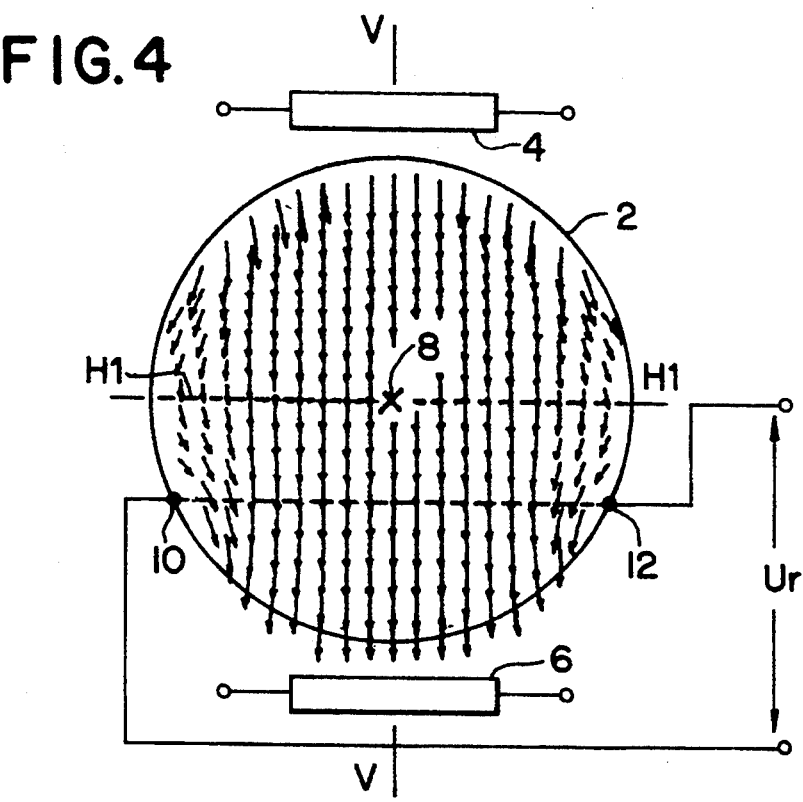
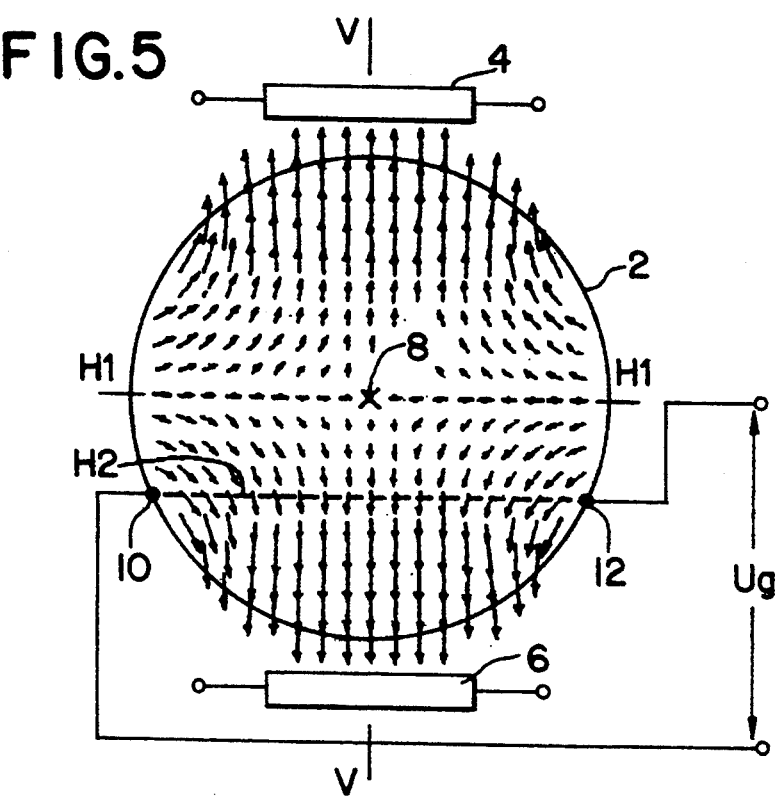

APPARATUS FOR MEASURING THE FLOW OF A FLUID FLOWING THROUGH A MEASURING TUBE

BACKGROUND OF THE INVENTION

The present invention relates to an apparatus for measuring the flow of a fluid including freely displaceable electric charges flowing through a substantially horizontally arranged measuring tube. The apparatus includes magnetic means for producing at least two states of a magnetic field in which the magnetic field extends through the measuring tube substantially mirror symmetrically relative to a vertical plane intersecting the axis of the measuring tube. The magnetic field in a first state extends in a horizontal plane intersecting the measuring tube. The magnetic field in the first state extends in substantially the same direction on both sides of the horizontal plane and in a second state extends in substantially opposite directions on both sides of the horizontal plane. At least one point of the second state of the magnetic field has a zero value and is located in the vertical plane and the horizontal plane. A single pair of electrodes are arranged at the measuring tube on both sides of the vertical plane to sense displacement of charges in the fluid. A circuit means corrects the voltage between the electrodes measured in the first state of the magnetic field, which voltage is usually only approximately proportional to the flow of the fluid, by using the voltage between the electrodes measured in the second state of the magnetic field to obtain an output signal substantially proportional to the flow of the fluid.

In a known apparatus of this type, the electrodes are located in a horizontal plane identical with the mentioned horizontal plane of both magnetic field states.

In the known apparatus it turned out that there is no definite correlation between the first-mentioned voltage and the flow of the fluid, but that this correlation rather is dependent on the flowing profile of the fluid.

One and the same value of the first voltage, therefore, requires different corrections dependent on the flowing profile. Such corrections cannot be made by the circuit means of the known apparatus because this apparatus is unable to detect different flowing profiles.

SUMMARY OF THE INVENTION

The object underlying the present invention resides in providing an apparatus for measuring the flow of fluid including freely displaceable electric charges and flowing through a substantially horizontally arranged tube wherein the mentioned definite correction is present.

For the accomplishment of this object, the apparatus is characterized in that the electrodes are located in a second horizontal plane offset relative to the first horizontal plane so that an unambiguous relation exists between the voltage on the one hand and the flow of the fluid on the other hand, said relation being dependent on the flow of the fluid, but independent of the flow profile of the fluid.

A special embodiment of the circuit arrangement is characterized in that it assigns a correction value to both voltages and corrects the first voltage by using this correction value to generate the output signal.

BRIEF DESCRIPTION OF THE DRAWINGS

Now an embodiment of the present invention is described in the following with reference to the appended drawings, in which

FIG. 4 is a view of a first state of the magnetic field; and

FIG. 5 is a view of a second state of the magnetic field.

DETAILED DESCRIPTION OF THE PREFERRED EMBODIMENTS

Figure 1:
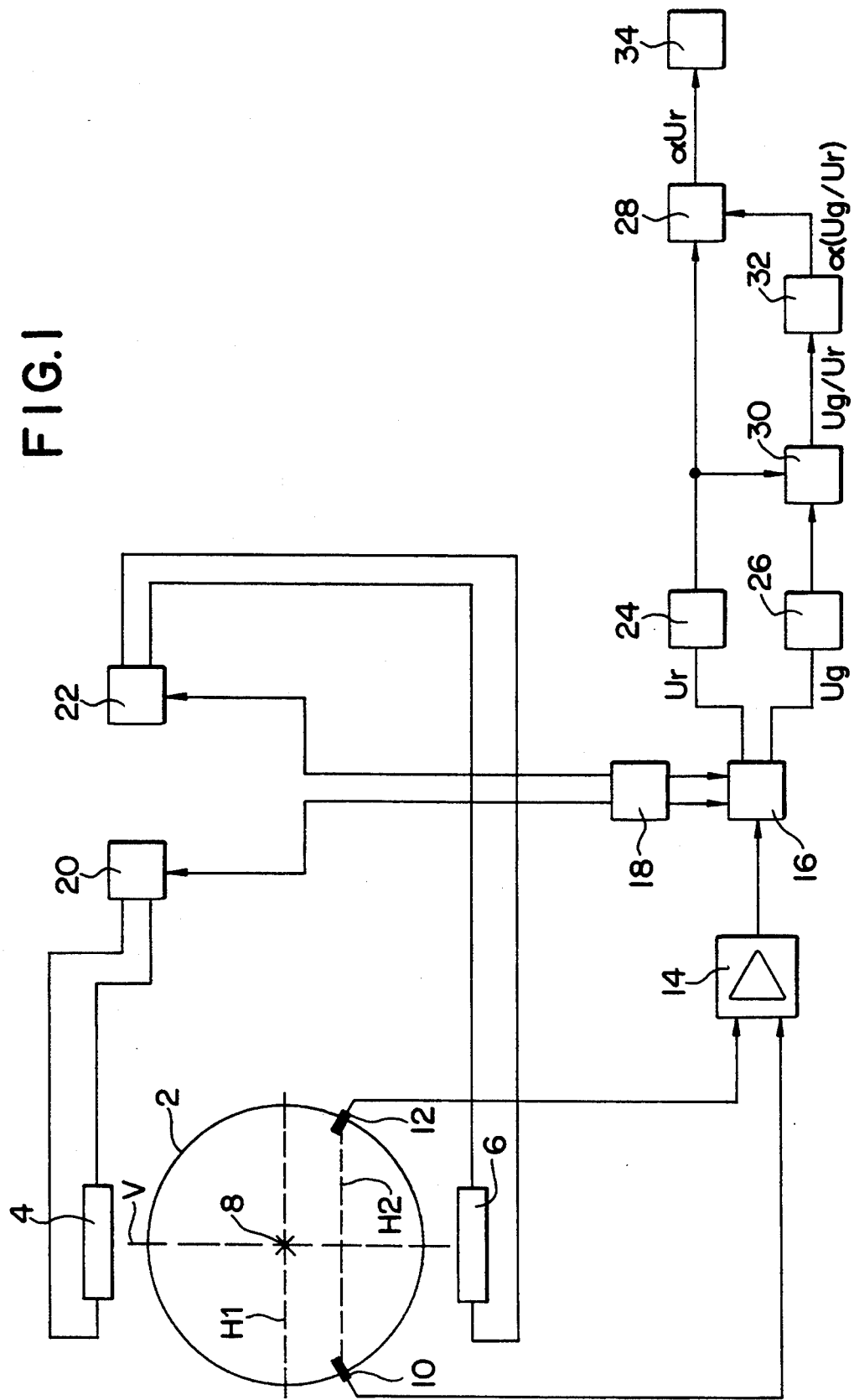
FIG. 1 is a schematic diagram of the apparatus with appertaining circuit means.

The apparatus of FIG. 1 comprises a measuring tube 2 with two coils 4, 6 being arranged above and below the measuring tube. The axes of the coils 4, 6 extend in a vertical plane V which intersects the axis 8 of the measuring tube. The states of the magnetic field shown in FIGS. 4 and 5 are produced by the coils 4, 6. When the magnetic field states produced by the coils 4, 6 work in the same direction, the state of the magnetic field shown in FIG. 4 comes about. The magnetic field in this state extends in a horizontal plane H1 extending through the measuring tube 2 in which - in this embodiment - the axis 8 of the measuring tube lies.

In the state of the magnetic field shown in FIG. 5, the magnetic fields produced by the coils 4, 6 are opposing so that around the axis 8 of the measuring tube 2 there is practically no magnetic field. The magnetic field rather is forced out of the central region of the measuring tube 2.

Obviously, both magnetic field states according to FIGS. 4 and 5 are substantially mirror symmetrical with respect to the vertical plane V.

On both sides of the vertical plane V, electrodes 10, 12 are mounted at the measuring tube 2 which - as is known - serve to detect charge displacements in the fluid flowing through the measuring tube 2. These charge displacements are caused - as is known - by the states of the magnetic fields, as explained in connection with FIGS. 4 and 5.

The electrodes 10, 12 are connected to an input of a switch 16 via an amplifier 14. This switch 16 is controlled by a clock generator 18 which also controls two drivers 20, 22 of the coils 4, 6. The electrodes 10, 12 are provided in a horizontal plane H2 offset relative to the horizontal plane H1 of the magnetic field states.

For the mode of operation of the apparatus under the present invention it is insignificant that precisely the two magnetic field states shown in FIGS. 4 and 5 are used, However the horizontal plane H1 must be offset relative to the horizontal plane H2 which can be caused by suitable differing intensities of energization of the coils 4, 6 in both magnetic field states, but also or moreover by different shaping of the coils 4, 6.

In the present embodiment, the voltage tapped between the electrodes 10, 12 in the state of the magnetic field shown in FIG. 4 is designated Ur and the voltage between the electrodes 10, 12 in the magnetic field state shown in FIG. 5 is designated Ug. Voltage Ur is the uncorrected voltage which thus is to be corrected. Voltage Ug serves to make the correction. Voltage Ur flows into a channel 24, and voltage Ug into a channel 26. Voltage Ur is supplied to an input of a multiplier 28 and to an input of a divider 30. Voltage Ug is supplied to another input of divider 30. A signal corresponding to the quotient Ug/Ur is supplied from an output of the divider to the input of a correction circuit 32 assigning a correction factor α(Ug/Ur) to the quotient Ug/Ur dependent on its value. This correction factor α is supplied to a second input of the multiplier 28. A signal corresponding to the product of α and Ur is supplied to an input of an output circuit 34 generating a signal corresponding to α·Ur, e.g. in an indicating instrument or a recorder.

Figure 3:
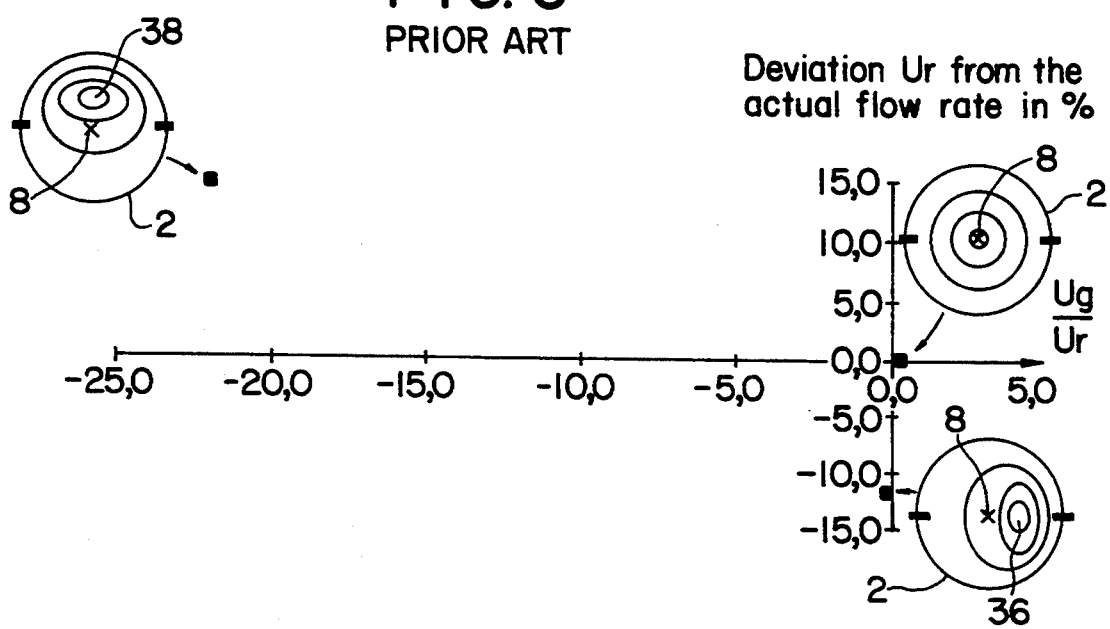
FIG. 3 serves to explain the known apparatus.

In a known apparatus, the deviations of Ur from the actual flow rates of the fluid through the measuring tube 2 in per cent in dependency of Ug/Ur correspond to measuring points shown in FIG. 3. When Ug/Ur equals zero, the deviation is zero for the rotation symmetrical flowing profile around the axis of the measuring tube 2. For a flowing profile with a maximum of flow density 36 offset from the axis to the right (the same applies to a displacement to the left), Ug/Ur also equals zero. But the deviation is about $-12\%$. This lack of certainty is overcome by the present invention. For the sake of completeness, it is to be noted that in the case of a displacement of the maximum flow density 38 upwardly (the same applies to a displacement downwardly) Ug/Ur will become about $-22$ corresponding to a deviation of 15%.

Figure 2:
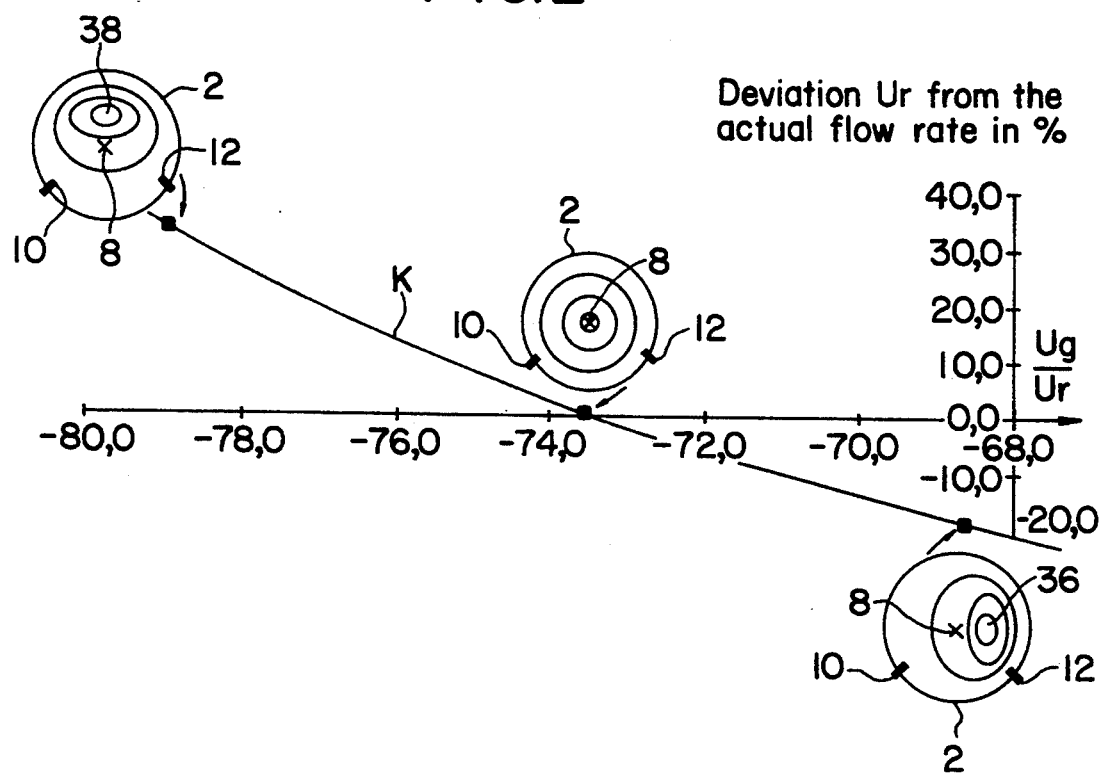
FIG. 2 serves to explain the operation of the apparatus.

When the planes H1, H2 are offset relative to one another, as described above in conjunction with the embodiment, surprisingly the ambiguity does not occur, as follows from FIG. 2. When the maximum of the flow density 36 is displaced from the axis 8 to the right, the deviation is $-20\%$ for Ug/Ur=68.5, and when the flow profile is rotation symmetrical around the axis 8, Ug/Ur=73.5 and the deviation is 0%. When the maximum of the flow density 38 is above the axis 8, Ug/Ur=$-79$ and the deviation is 35%. The curve K in FIG. 2 shows the unambiguous relation. The respective ordinates of the curve K directly allow the calculation of the corresponding α values ($\alpha = 1/[1+K/100]$).

We claim:

1. An apparatus for measuring the flow of a fluid including freely displaceable electric charges and flowing through a substantially horizontally arranged measuring tube, comprising:

magnetic means for producing at least two states of a magnetic field in which the magnetic field extends through the measuring tube in a substantially mirror symmetrical manner relative to a vertical plane that intersects a longitudinal axis of the measuring tube;

said magnetic field in a first state extending through a horizontal plane that intersects the measuring tube, the first state of the magnetic field extending in substantially the same direction on both sides of the horizontal plane; and in a second state the magnetic field extends in substantially opposite directions on both sides of the horizontal plane, the second state of the magnetic field including at least one point having a zero value and located in the vertical plane and the horizontal plane;

a single pair of electrodes located at the measuring tube on opposite sides of the vertical plane to sense displacement of charges in the fluid; and circuit means for correcting a voltage between said electrodes in the first state of the magnetic field, which voltage is usually only approximately proportional to the flow of the fluid, by using a second voltage between the electrodes in the second state of the magnetic field to obtain an output signal substantially proportional to the flow of the fluid; wherein said electrodes are located in a second horizontal plane offset relative to said first horizontal plane so that a relation exists between the voltage on the one and the second voltage, and the flow of the fluid, said relation being dependent on the flow of the fluid, but independent of the flow profile of the fluid.

2. The apparatus as set forth in claim 1, wherein said circuit means assigns a correction value to the voltage and the second voltage and corrects the voltage by using the correction value for generating the output signal.

* * * * *